(12) United States Patent  (10) Patent No.: US 9,187,068 B2
Vernacchia et al.  (45) Date of Patent: Nov. 17, 2015

(54) METHOD OF APPLYING AN ELECTRIC PARKING BRAKE SYSTEM IN HYBRID AND ELECTRIC VEHICLE PROPULSION SYSTEMS

(71) Applicant: GM GLOBAL TECHNOLOGY OPERATIONS LLC, Detroit, MI (US)

(72) Inventors: Mark A. Vernacchia, Northville, MI (US); Padma Sundaram, West Bloomfield, MI (US); Orson S. Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 14/249,382

(22) Filed: Apr. 10, 2014

(65) Prior Publication Data

US 2015/0291135 A1    Oct. 15, 2015

(51) Int. Cl.
 *B60T 13/74* (2006.01)
 *B60T 7/12* (2006.01)
 *B60T 17/22* (2006.01)

(52) U.S. Cl.
 CPC ............. *B60T 7/122* (2013.01); *B60T 13/741* (2013.01); *B60T 17/22* (2013.01)

(58) Field of Classification Search
 CPC ........ B60T 7/122; B60T 13/741; B60T 17/22
 USPC ................. 701/70, 36; 188/162; 310/198
 See application file for complete search history.

(56) References Cited

U.S. PATENT DOCUMENTS

| | | | | |
|---|---|---|---|---|
| 5,348,123 A | * | 9/1994 | Takahashi et al. | 188/72.1 |
| 5,661,355 A | * | 8/1997 | Darceot | 310/180 |
| 2005/0184612 A1 | * | 8/2005 | Cros et al. | 310/158 |
| 2011/0050025 A1 | * | 3/2011 | Doushita et al. | 310/198 |
| 2011/0147144 A1 | * | 6/2011 | Ma et al. | 188/162 |

* cited by examiner

Primary Examiner — Richard Camby
(74) Attorney, Agent, or Firm — Quinn Law Group, PLLC

(57) ABSTRACT

A method applying an electric park brake system of a vehicle includes detecting a park request with a first vehicle control module, and sending a park command, from the first vehicle control module, to both an electric brake control module and a second vehicle control module. Upon the electric brake control module receiving the park command, an actuation signal is sent from the electric brake control module to a motor winding of the electric park brake system. A status actuated signal is sent from the electric brake control module to the second vehicle control module. The status actuated signal indicates that the actuation signal has been sent from the electric brake control module. A position of the motor winding is sensed to determine if the motor winding is actuated. When the motor winding is actuated, a message is displayed to indicate that the electric park brake system is applied.

19 Claims, 2 Drawing Sheets

METHOD OF APPLYING AN ELECTRIC PARKING BRAKE SYSTEM IN HYBRID AND ELECTRIC VEHICLE PROPULSION SYSTEMS

TECHNICAL FIELD

The invention generally relates to a method of applying an electric park brake system of a vehicle.

BACKGROUND

Traditional vehicles having an internal combustion engine include a transmission having a mechanical park mechanism. The mechanical park mechanism typically includes a park pawl that mechanically engages a park gear that is splined to an output shaft of the transmission. The park pawl engages the park gear to prevent rotation of the output shaft, thereby preventing rotation of the drive wheels coupled to the transmission.

Vehicles having non-traditional propulsion systems, such as propulsion systems in which an electric motor is directly attached to each independent wheel, or to individual axles, do not include a transmission, and therefore do not lend themselves to the traditional mechanical park mechanisms.

SUMMARY

A method applying an electric park brake system of a vehicle is provided. The method includes detecting a park request with a first vehicle control module, and sending a park command, from the first vehicle control module, to both an electric brake control module and a second vehicle control module. The park command is sent to request that the electric park brake system be actuated. Upon the electric brake control module receiving the park command from the first vehicle control module, an actuation signal is sent from the electric brake control module to a motor winding of the electric park brake system. The actuation signal is sent to actuate the motor winding. A status actuated signal is sent from the electric brake control module to the second vehicle control module. The status actuated signal indicates that the actuation signal has been sent, from the electric brake control module to the motor winding, to actuate the motor winding. A position of the motor winding is sensed to determine if the motor winding is actuated in response to the actuation signal. When the position of the motor winding indicates that the motor winding is actuated, a message is displayed to indicate that the electric park brake system is applied.

A vehicle is also provided. The vehicle includes at least one wheel, and a propulsion system selection device that is operable to generate a park request. A first vehicle control module is disposed in electronic communication with the propulsion system selection device. The first vehicle control module is operable to receive the park request from the propulsion system selection device, and to transmit a park command. An electric brake control module is disposed in electronic communication with the first vehicle control module. The electric brake control module is operable to receive the park command from the first vehicle control module, and to transmit an actuation signal. An electric park brake system is coupled to the at least one wheel, and includes a motor winding actuateable in response to the actuation signal from the electric brake control module. The motor winding is actuateable to prevent rotation of the at least one wheel. A second vehicle control module is disposed in electronic communication with the first vehicle control module and with the electric brake control module. The second vehicle control module is operable to receive the park command from the first vehicle control module, and to transmit the actuation signal to the electric park brake system when the electric brake control module fails to transmit the actuation signal.

Accordingly, the first vehicle control module transmits the park command to both the electric brake control module and the second vehicle control module to actuate the electric park brake system to secure the vehicle. The electric park brake system sends the actuation signal to the motor winding to actuate the electric park brake system, and simultaneously sends the status actuated signal to the second vehicle control module to notify the second vehicle control module that the actuation signal has been sent. If the second vehicle control module fails to receive the status actuated signal, after receiving the park command, or if the second vehicle control module otherwise determines that the electric brake control module has failed to send the actuation signal, then the second vehicle control module sends the actuation signal to the motor winding to actuate the electric park brake system. A position of the motor winding is sensed to determine if the motor winding, and thereby the electric park brake system, was actuated by the actuation signal. If the motor winding is actuated, then a message is displayed to indicate that the electric park brake system is actuated, and the vehicle is secured. If the motor winding is not actuated by the actuation signal, the second vehicle control module may activate a back-up brake device to secure the vehicle.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
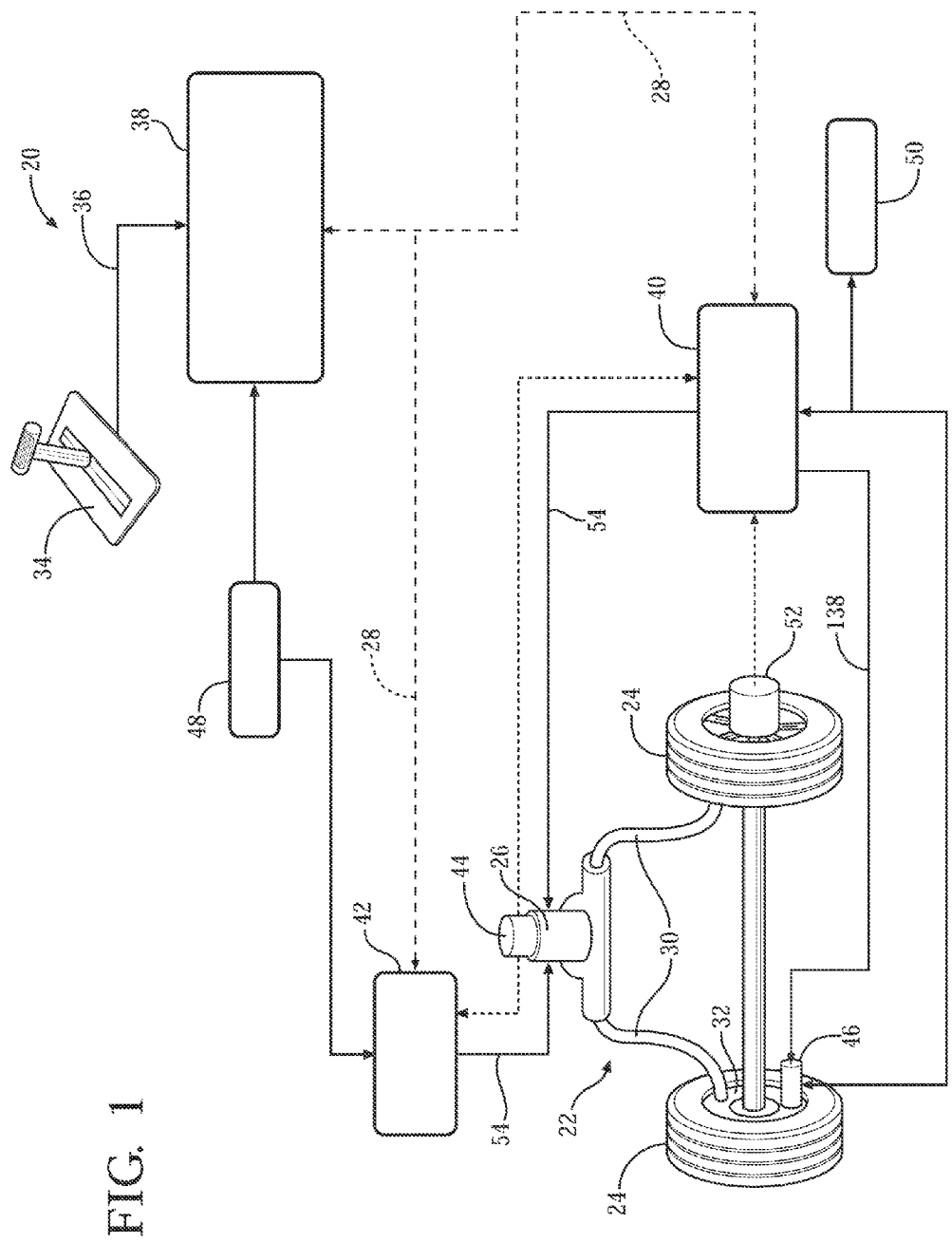
FIG. 1 is a schematic diagram of a vehicle.

Referring to the Figures, wherein like numerals indicate like parts throughout the several views, a vehicle is generally shown at 20 in FIG. 1. Referring to FIG. 1, the vehicle 20 includes an electric park brake system 22, which is used to secure the vehicle 20 when a park mode is requested by an operator. The vehicle 20 may include any type and/or style of vehicle 20, such as but not limited to a hybrid electric vehicle, or an extended range electric vehicle. The invention described herein is particularly useful for vehicles using electric propulsion systems, particularly those having a propulsion motor disposed at one or more wheels, or incorporated into an axle, because such electric propulsion systems may not include a typical transmission in which to incorporate a mechanical park mechanism. However, the invention may still be utilized in conventional vehicles, having an internal combustion engine and a conventional transmission that are coupled to drive wheels to provide propulsion, so long as the conventional vehicle includes the electric park brake system 22.

The vehicle 20 includes at least one wheel 24 that is coupled to the electric park brake system 22. The electric park brake system 22 is operable to prevent rotation of the wheel 24, and thereby secure the vehicle 20. The electric park brake system 22 may be configured in any suitable manner. For example, the electric park brake system 22 may include a motor winding 26, which is actuateable in response to an actuation signal 28 to apply the electric park brake system 22, and prevent rotation of the wheel 24. The motor winding 26 may include an electric motor winding 26 that is rotatable in response to the actuation signal 28, e.g., an electric current, to generate and/or apply torque. For example, the electric park brake system 22 may include a cable 30 connecting the motor winding 26 and a wheel brake 32 disposed at or on the wheel 24. Application of the actuation signal 28 to the motor winding 26 moves the motor winding 26, which applies torque to the cable 30, which moves or otherwise operates to apply the wheel brake 32 to prevent rotation of the wheel 24.

The vehicle 20 includes a propulsion system selection device 34. The propulsion system selection device 34 is used to control the operation of the vehicle 20, and may be referred to as a shifter, a transmission shift lever, gear selector, etc. The propulsion system selection device 34 is moved or otherwise manipulated to input a requested propulsion mode of the vehicle 20. The various propulsion modes may include, but are not limited to, a park mode, a forward drive mode, or a reverse drive mode. The forward drive mode may be selected to move the vehicle 20 forward. The reverse drive mode may be selected to move the vehicle 20 rearward. The park mode may be selected to secure the position of the vehicle 20 and prevent the vehicle 20 from moving. When the park mode is selected, the propulsion system selection device 34 sends a park request 36 to one or more components of the vehicle 20, requesting that the electric park brake system 22 be applied to secure the position of the vehicle 20, as described in greater detail below.

The vehicle 20 further includes a first vehicle control module 38, a second vehicle control module 40, and an electric brake control module 42. The first vehicle control module 38 is disposed in electronic communication with the propulsion system selection device 34. The second vehicle control module 40 and the electric brake control module 42 are disposed in electronic communication with each other, and also with the first vehicle control module 38. The electronic communication between the propulsion system selection device 34, the first vehicle control module 38, the second vehicle control module 40, and the electric brake control module 42 may be through either a hardwired communication system, or a wireless communication system.

The first vehicle control module 38 may include a computer and/or processor, and include all software, hardware, memory, algorithms, connections, sensors, etc., necessary to perform the functions and operate as described herein. As such, a method of applying the electric park brake system 22 may be at least partially embodied as a program operable on the first vehicle control module 38. It should be appreciated that the first vehicle control module 38 may include any device capable of analyzing data from various sensors, comparing data, making the necessary decisions and executing the required tasks required to execute the method described herein. The first vehicle control module 38 may include one or more control modules. For example, the first vehicle control module 38 may include but is not limited to an integrated chassis control module combined with an electronic shift module, or a transmission control module having an internal mode switch.

The second vehicle control module 40 may include a computer and/or processor, and include all software, hardware, memory, algorithms, connections, sensors, etc., necessary to perform the functions and operate as described herein. As such, the method of applying the electric park brake system 22 may be at least partially embodied as a program operable on the second vehicle control module 40. It should be appreciated that the second vehicle control module 40 may include any device capable of analyzing data from various sensors, comparing data, making the necessary decisions and executing the required tasks required to execute the method described herein. The second vehicle control module 40 may include one or more control modules. For example, the second vehicle control module 40 may include but is not limited to an engine control module combined with a traction power inverter module.

The electric brake control module 42 may include a computer and/or processor, and include all software, hardware, memory, algorithms, connections, sensors, etc., necessary to manage and control the operation of the electric park brake system 22. As such, the method of applying the electric park brake system 22 may be at least partially embodied as a program operable on the electric brake control module 42. It should be appreciated that the electric brake control module 42 may include any device capable of analyzing data from various sensors, comparing data, making the necessary decisions required to control the operation of the electric park brake system 22, and executing the required tasks necessary to control the operation of the electric park brake system 22.

The electric park brake system 22 includes resolver 44 that is coupled to the motor winding 26. The resolver 44 is operable to sense a position of the motor winding 26. The resolver 44 is a rotary electrical transformer used to measure degrees of rotation and/or rotation of a device. The resolver 44 is used to measure the position or movement of the motor winding 26 to determine if the motor winding 26 has moved in response to the actuation signal 28. If the resolver 44 detects movement, or detects that the motor winding 26 is disposed in a pre-defined applied position, then one of the electric brake control module 42, or the second vehicle control module 40 may determine that the motor winding 26 is actuated, and that the electric park brake system 22 is applied. If the resolver 44 does not detect movement, or detects that the motor winding 26 is disposed in a pre-defined not-applied position, then one of the electric brake control module 42, or the second vehicle control module 40 may determine that the motor winding 26 is not actuated, and that the electric park brake system 22 is not applied.

The vehicle 20 further includes a back-up brake device 46. The back-up brake device 46 is disposed in electronic communication with at least one of the electric brake control module 42 and/or the second vehicle control module 40. The back-up brake device 46 is coupled to the at least one wheel 24, and is operable to prevent rotation of the at least one wheel 24 when activated. The back-up brake device 46 may include any device capable of preventing rotation of the at least one wheel 24. For example, the back-up brake device 46 may include, but is not limited to, an electric motor coupled to the brake system of the wheel 24 for actuating the brake system.

The vehicle 20 includes a primary electric power supply 48, and a secondary electric power supply 50. The primary electric power supply 48 is coupled to the electric brake control module 42, and may also be coupled to the first vehicle control module 38. The primary electric power supply 48 supplies electrical power to the electric brake control module 42, and may also be used to supply power to the first vehicle control module 38. Preferably, the primary electric power supply 48 includes a 12V system having a power storage device, such as a 12V battery. The secondary electric power supply 50 is coupled to the back-up brake device 46, and may also be coupled to the second vehicle control module 40. The secondary electric power supply 50 supplies electrical power to the back-up brake device 46, and may also be used to supply power to the second vehicle control module 40. Preferably, the secondary electric power supply 50 includes a 12V system having a power storage device, such as a 12V battery. The primary electric power supply 48 and the secondary electric power supply 50 are separate and independent from each other. Accordingly, if the primary electric power supply 48 fails, then the secondary electric power supply 50 is available to power the back-up brake device 46 and the second vehicle control module 40.

The vehicle 20 may further include at least one motion sensor 52. The motion sensor 52 is disposed in electronic communication with at least the second vehicle control module 40, and may also be disposed in electronic communication with the electric brake control module 42. The motion sensor 52 may be coupled to the second vehicle control module 40 and/or the electric brake control module 42 through either a hardwired communication system, or a wireless communication system, to transmit data therebetween. The motion sensor 52 is operable to sense movement of the vehicle 20 and/or the wheel 24. The motion sensor 52 may include, but is not limited to, a transmission output speed sensor operable to sense a rotation speed of an output shaft of a transmission, a wheel 24 speed sensor operable to sense rotation of the wheel 24, and/or an inclinometer operable to sense a change in an orientation of the vehicle 20.

When the operator manipulates the propulsion system selection device 34 to select the park mode, the propulsion system selection device 34 is operable to generate the park request 36. The park request 36 is a signal sent out from the propulsion system selection device 34 to the first vehicle control module 38. The first vehicle control module 38 is operable to receive the park request 36 from the propulsion system selection device 34, and transmit a park command 54. The park command 54 is an electronic signal sent out to the electric brake control module 42 and the second vehicle control module 40. Both the electric brake control module 42 and the second vehicle control module 40 are operable to receive the park command 54 from the first vehicle control module 38, and transmit the actuation signal 28 to the motor winding 26 of the electric park brake system 22. The second vehicle control module 40 operates as a back-up control module for the electric brake control module 42. As such, the second vehicle control module 40 only transmits the actuation signal 28 to the electric park brake system 22 when the electric brake control module 42 fails to transmit the actuation signal 28. Additionally, if the electric park brake system 22 is inoperable, then the second vehicle control module 40 may activate the back-up brake device 46 to secure the position of the vehicle 20.

Figure 2:
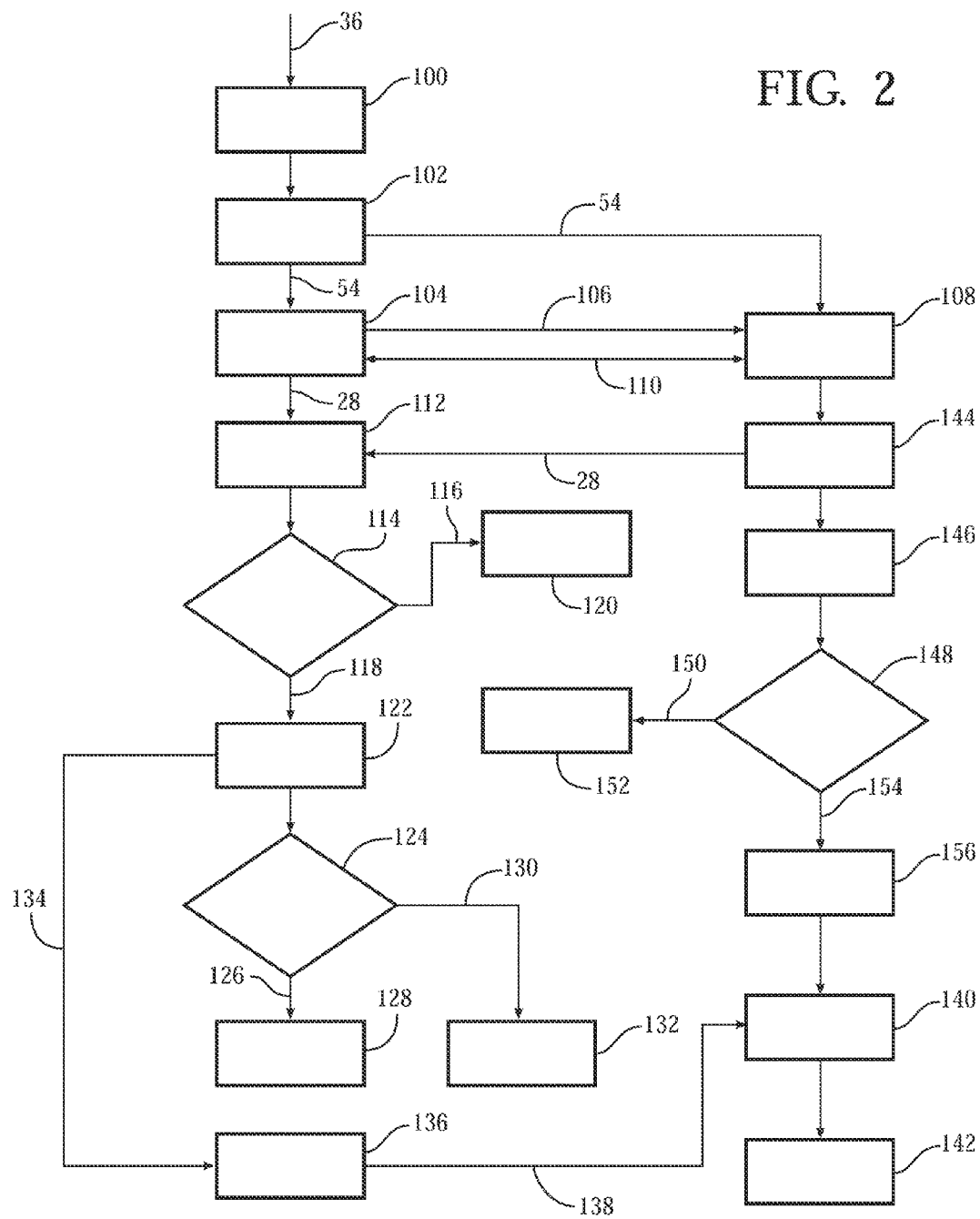
FIG. 2 is a flowchart showing a method of applying an electric park brake system of the vehicle.

Referring to FIG. 2, the method of applying the electric park brake system 22 of the vehicle 20 is described in detail below. The method includes detecting the park request 36 from the propulsion system selection device 34 with the first vehicle control module 38, generally indicated by box 100. As noted above, the propulsion system selection device 34 sends the park request 36 when the operator selects the park mode. The first vehicle control module 38 is in communication with the propulsion system selection device 34 to receive and interpret the park request 36.

Upon receiving the park request 36 from the propulsion system selection device 34, the first vehicle control module 38 sends the park command 54 to the electric brake control module 42, and to the second vehicle control module 40, general indicated by box 102. The park command 54 is the electronic signal requesting that the electric park brake system 22 be actuated.

Upon the electric brake control module 42 receiving the park command 54 from the first vehicle control module 38, the electric brake control module 42 sends the actuation signal 28 to the motor winding 26 of the electric park brake system 22, generally indicated by box 104, to actuate the motor winding 26. Subsequent to sending the actuation signal 28 to the motor winding 26, the electric brake control module 42 sends a status actuated signal 106 to the second vehicle control module 40. The status actuated signal 106 indicates that the actuation signal 28 has been sent from the electric brake control module 42 to the motor winding 26 to actuate the motor winding 26. The status actuated signal 106 operates to inform the second vehicle control module 40 that the electric brake control module 42 has received the park command 54, and that the electric brake control module 42 is operational and functioning properly.

The second vehicle control module 40 determines a state of health of the electric brake control module 42, generally indicated by box 108. The second vehicle control module 40 may determine, based upon receiving the status actuated signal 106 from the electric brake control module 42, that the electric brake control module 42 is healthy and operating properly. Additionally, the second vehicle control module 40 may further query the electric brake control module 42, generally indicated at 110, or otherwise determine that the electric brake control module 42 is or is not operating properly. If the second vehicle control module 40 determines that the electric brake control module 42 is operating properly, then the second vehicle control module 40 takes no further action at this time.

When the actuation signal 28 is sent by the electric brake control module 42, the electric brake control module 42 may sense a position of the motor winding 26, generally indicated by box 112. The sensed position of the resolver 44 is used to determine if the motor winding 26 was actuated in response to the actuation signal 28, or if the motor winding 26 failed to actuate in response to the actuation signal 28, generally indicated by box 114. As described above, the position of the motor winding 26 may be sensed by monitoring a position of the motor winding 26, over time, with the resolver 44. The electric brake control module 42 is operable to determine if the motor winding 26 was actuated, generally indicated at 116, or was not actuated, generally indicated at 118, in response to the actuation signal 28 from the data sensed from the resolver 44 regarding the rotational position of the motor winding 26.

If the electric brake control module 42 determines that the position of the motor winding 26 indicates that the motor winding 26 was actuated in response to the actuation signal 28, then the electric brake control module 42 may display a message, generally indicated by box 120, such as by illuminating a dashboard light, to indicate that the electric park brake system 22 is applied.

If the electric brake control module 42 determines that the position of the motor winding 26 indicates that the motor winding 26 was not actuated in response to the actuation signal 28, and that the electric park brake system 22 may not have been successfully applied, then the electric brake control module 42 sends a request, generally indicated at 134, to the second vehicle control module 40, requesting that the second vehicle control module 40 activate the back-up brake device 46, generally indicated by box 122. Additionally, when the electric brake control module 42 determines that the motor winding 26 was not actuated, based on the resolver 44 failing to detect movement of the motor winding 26, or the sensed position of the motor winding 26 from the resolver 44 indicating that the motor winding 26 was not actuated, then the electric brake control module 42 may run a diagnostic test on the resolver 44 to determine if the resolver 44 is functioning properly, generally indicated by box 124.

If the diagnostic test of the resolver 44 determines that the resolver 44 is not operating properly, generally indicated at 126, and the motor winding 26 was not actuated in response to the actuation signal 28, then the electric brake control module 42 may set and/or define a diagnostic trouble code indicating that the resolver 44 and the electric park brake system 22 are not operating properly, generally indicated by box 128. Alternatively, if the diagnostic test of the resolver 44 determines that the resolver 44 is operating properly, generally indicated at 130, but that the motor winding 26 was not actuated in response to the actuation signal 28, then the electric brake control module 42 may set and/or define a diagnostic trouble code indicating that the resolver 44 is operating properly, but that the electric park brake system 22 is not operating properly, generally indicated by box 132.

When no movement of the motor winding 26 is detected in response to the actuation signal 28, and when signaled by the electric brake control module 42, generally indicated at 134, the second vehicle control module 40 activates the back-up brake device 46 to prevent movement of the vehicle 20, generally indicated by box 136. The second vehicle control module 40 sends an activation signal 138, e.g., an electric current, to the back-up brake device 46 to activate the back-up brake device 46. Additionally, the second vehicle control module 40 may signal a warning when no movement of the motor winding 26 of the electric park brake system 22 is detected and the back-up brake device 46 is activated, such as by illuminating a dashboard warning light.

When the back-up brake device 46 is activated by the activation signal 138, the second vehicle control module 40 monitors motion of the vehicle 20, over time, to determine if the vehicle 20 is moving, generally indicated by box 140. The second vehicle control module 40 monitors the motion of the vehicle 20 from data received from the motion sensors 52. Accordingly, based on the data from the motion sensors 52 on the vehicle 20, the second vehicle control module 40 may determine if the vehicle 20 is moving, or is remaining stationary. When the back-up brake device 46 is activated, and when the second vehicle control module 40 determines that the vehicle 20 is not moving, i.e., that no motion of the vehicle 20 is detected, then the second vehicle control module 40 may display a message indicating that the vehicle 20 is secured, generally indicated by box 142.

If upon receiving the park command 54 from the first vehicle control module 38, and querying the electric brake control module 42, the second vehicle control module 40 determines that the electric brake control module 42 is off-line or otherwise not functioning properly, generally indicated by box 144, the second vehicle control module 40 may send the actuation signal 28 to the motor winding 26 of the electric park brake system 22, to actuate the motor winding 26.

When the actuation signal 28 is sent by the second vehicle control module 40, the second vehicle control module 40 may sense a position of the motor winding 26, generally indicated by box 146. The position of the resolver 44 is sensed to determine if the motor winding 26 was actuated in response to the actuation signal 28, or if the motor winding 26 failed to actuate in response to the actuation signal 28, generally indicated by box 148. As described above, the position of the motor winding 26 may be sensed by monitoring a position of the motor winding 26, over time, with the resolver 44. The second vehicle control module 40 is operable to determine if the motor winding 26 was actuated, or was not actuated, in response to the actuation signal 28 from the data sensed from the resolver 44 regarding the rotational position of the motor winding 26.

If the second vehicle control module 40 determines that the position of the motor winding 26 indicates that the motor winding 26 was actuated in response to the actuation signal 28, generally indicated at 150, then the second vehicle control module 40 may display a message, generally indicated by box 152, such as by illuminating a dashboard light, to indicate that the electric park brake system 22 is applied, and the vehicle 20 is secure. Furthermore, if the second vehicle control module 40 determines that the electric brake control module 42 was off-line and/or not operating properly, generally indicated at 154, then the second vehicle control module 40 may define and/or set a diagnostic trouble code indicating that the electric brake control module 42 is non-responsive.

If the second vehicle control module 40 determines that the position of the motor winding 26 indicates that the motor winding 26 was not actuated in response to the actuation signal 28, generally indicated at 154 and that the electric park brake system 22 may not have been successfully applied, the second vehicle control module 40 activates the back-up brake device 46 to prevent movement of the vehicle 20, generally indicated by box 156. The second vehicle control module 40 sends an activation signal 138, e.g., an electric current, to the back-up brake device 46 to activate the back-up brake device 46. Additionally, the second vehicle control module 40 may signal a warning when no movement of the motor winding 26 of the electric park brake system 22 is detected and the back-up brake device 46 is activated, such as by illuminating a dashboard warning light.

When the back-up brake device 46 is activated, the second vehicle control module 40 monitors motion of the vehicle 20, over time, to determine if the vehicle 20 is moving, generally indicated by box 140. The second vehicle control module 40 monitors the motion of the vehicle 20 from data received from the motion sensors 52. Accordingly, based on the data from the motion sensors 52 on the vehicle 20, the second vehicle control module 40 may determine if the vehicle 20 is moving, or is remaining stationary. When the back-up brake device 46 is activated, and when the second vehicle control module 40 determines that the vehicle 20 is not moving, i.e., that no motion of the vehicle 20 is detected, then the second vehicle control module 40 may display a message indicating that the vehicle 20 is secured, generally indicated by box 142.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method applying an electric park brake system of a vehicle, the method comprising:

detecting a park request with a first vehicle control module;

sending a park command, from the first vehicle control module to an electric brake control module and to a second vehicle control module, to request that the electric park brake system be actuated;

sending an actuation signal, from the electric brake control module to a motor winding of the electric park brake system, to actuate the motor winding, when the electric brake control module receives the park command from the first vehicle control module;

sending a status actuated signal from the electric brake control module to the second vehicle control module indicating that the actuation signal, from the electric brake control module, has been sent to the motor winding to actuate the motor winding;

sensing a position of the motor winding to determine if the motor winding is actuated in response to the actuation signal; and displaying a message to indicate that the electric park brake system is applied when the position of the motor winding indicates that the motor winding is actuated.

2. The method set forth in claim 1 further comprising sending an actuation signal, from the second vehicle control module to the motor winding of the electric park brake system, to actuate the motor winding, upon the second vehicle control module receiving the park command from the first vehicle control module, and the second vehicle control module determining that the electric brake control module is non-responsive.

3. The method set forth in claim 2 wherein sensing a position of the motor winding includes monitoring a position of the motor winding, over time, with a resolver attached to the motor winding.

4. The method set forth in claim 3 wherein sensing a position of the motor winding is further defined as sensing the position of the motor winding with the second vehicle control module, when the actuation signal is sent by the second vehicle control module.

5. The method set forth in claim 3 wherein sensing a position of the motor winding is further defined as sensing the position of the motor winding with the electric brake control module, when the actuation signal is sent by the electric brake control module.

6. The method set forth in claim 3 further comprising determining if the resolver on the motor winding is functioning properly when the resolver fails to detect movement of the motor winding.

7. The method set forth in claim 2 further comprising defining a diagnostic trouble code indicating that the electric brake control module is non-responsive.

8. The method set forth in claim 1 further comprising activating a back-up brake device, with the second vehicle control module, to prevent movement of the vehicle when no movement of the motor winding is detected in response to the actuation signal.

9. The method set forth in claim 8 further comprising signaling a warning when no movement of the motor winding of the electric park brake system is detected and the back-up brake device is activated.

10. The method set forth in claim 8 further comprising monitoring motion of the vehicle over time with the second vehicle control module.

11. The method set forth in claim 10 further comprising indicating that the vehicle is secured when the back-up brake device is activated and no motion of the vehicle is detected.

12. The method set forth in claim 1 further comprising sending a request from the electric brake control module to the second vehicle control module, requesting that the second vehicle control module activate a back-up brake device when the motor winding is not actuated in response to the actuation signal.

13. A vehicle comprising:
at least one wheel;
a propulsion system selection device operable to generate a park request;
a first vehicle control module disposed in electronic communication with the propulsion system selection device and operable to receive the park request from the propulsion system selection device and transmit a park command;
an electric brake control module disposed in electronic communication with the first vehicle control module, and operable to receive the park command from the first vehicle control module and transmit an actuation signal;
an electric park brake system coupled to the at least one wheel, and including a motor winding actuateable in response to the actuation signal from the electric brake control module to prevent rotation of the at least one wheel; and
a second vehicle control module disposed in electronic communication with the first vehicle control module and with the electric brake control module, and operable to receive the park command from the first vehicle control module and transmit the actuation signal to the electric park brake system when the electric brake control module fails to transmit the actuation signal.

14. The vehicle set forth in claim 13 further comprising a back-up brake device disposed in electronic communication with the second vehicle control module, coupled to the at least one wheel, and operable to prevent rotation of the at least one wheel, wherein the back-up brake device is activated by the second vehicle control module when the electric brake control module and/or the electric park brake system are inoperable.

15. The vehicle set forth in claim 14 further comprising a primary electric power supply coupled to the electric brake control module, and a secondary electric power supply coupled to the back-up brake device, wherein the primary electric power supply and the secondary electric power supply are separate and independent from each other.

16. The vehicle set forth in claim 13 wherein the electric park brake system includes a resolver coupled to the motor winding, and operable to sense a position of the motor winding.

17. The vehicle set forth in claim 13 wherein the first vehicle control module includes an integrated chassis control module and an electronic shift module, or a transmission control module with an internal mode switch.

18. The vehicle set forth in claim 13 wherein the second vehicle control module includes an engine control module and a traction power inverter module.

19. The vehicle set forth in claim 13 further comprising at least one motion sensor disposed in electronic communication with the second vehicle control module and operable to sense movement of the at least one wheel.

* * * * *